United States Patent [19]

Otani

[11] Patent Number: 4,476,728

[45] Date of Patent: Oct. 16, 1984

[54] VORTEX FLOW METER

[75] Inventor: Hichiro Otani, Hyogo, Japan

[73] Assignee: Mitsubishi Denki Kabushiki Kaisha, Tokyo, Japan

[21] Appl. No.: 409,217

[22] Filed: Aug. 18, 1982

[30] Foreign Application Priority Data

Aug. 19, 1981 [JP] Japan .................. 56-123446

[51] Int. Cl.³ .............................. G01F 1/32
[52] U.S. Cl. .............................. 73/861.22
[58] Field of Search .................. 73/861.22, 118 A

[56] References Cited

U.S. PATENT DOCUMENTS 4,320,650  3/1982  Kita ..................... 73/861.22 X

FOREIGN PATENT DOCUMENTS 0009015  3/1975  Japan ..................... 73/861.22
0058952  5/1977  Japan ..................... 73/861.24
0089764  8/1978  Japan ..................... 73/861.22
0000469  1/1980  Japan ..................... 73/861.22
0026219  3/1981  Japan ..................... 73/861.21

Primary Examiner—Charles A. Ruehl
Attorney, Agent, or Firm—Sughrue, Mion, Zinn, Macpeak & Seas

[57] ABSTRACT

The vortex flow meter includes a conduit for the passage of a fluid therethrough and a vortex generator disposed in said conduit at the upstream end thereof. The vortex generator includes a plurality of vortex amplifying plates which are disposed at right angles to the flow of fluid through the conduit and a pair of symmetrically disposed hot wires are mounted under tension on posts protruding from the surface of the downstream plate in spaced relation to the surface of the plate.

1 Claim, 3 Drawing Figures

VORTEX FLOW METER

BACKGROUND OF THE INVENTION

The present invention is directed to a vortex flow meter and more particularly to the vortex detecting elements within the flow meter.

Vortex flow meter devices are generally operative to generate a frequency signal proportionate to the flow rate or velocity of a fluid passing through a conduit. In such devices a plurality of vortices are generated downstream from a vortex generator which is inserted into the fluid to be measured. There are a number of methods for detecting the vortices in terms of changes in pressure, flow velocity, transmission of ultrasonic waves, radiation of heat-sensitive elements or the like. However, an accurate frequency signal cannot be produced unless a sensor for producing such an electric output signal corresponding to the frequency of the aforementioned vortices is properly positioned within the conduit. An example of a method for properly positioning the sensor is explained in detail in Japanese Patent Publication No. 54-38513. An excellent method for measuring the frequency of Karman's vortices is a hot wire system which is highly responsive but inexpensive and is suitable over a wide flow rate range from a very low flow rate to a very high flow rate.

One of the problems with such a hot wire system is that the hot wires are easily broken when they are extended under tension since they are extremely thin. Also, if the hot wires are extended under tension directly on the conduit through which the fluid to be measured flows, the hot wires will break unless their thermal expansion is identical to that of the conduit for the fluid. Furthermore, the hot wires themselves tend to deteriorate rapidly when they are exposed directly to the pressure of the fluid passing through the conduit. In order to avoid the aforementioned problems, it has been proposed to deposit platinum or the like directly on the surface of the vortex generator. However, in such a method, the responsiveness of the hot wire system deteriorates since the heat of the deposited platinum is transferred to the vortex generator. In order to raise the temperature of the deposited conductive material an additional amount of current must be supplied which renders the system uneconomical.

SUMMARY OF THE INVENTION

The present invention provides a new and improved vortex flow meter utilizing a hot wire system for detecting and measuring the frequency of the vortices which eliminates the aforementioned problems while carrying out the detection and measurement in a simple and economical method.

The present invention provides a new and improved vortex flow meter utilizing a hot wire system wherein the hot wires are disposed downstream of the vortex generator out of the direct path of the fluid while being supported in spaced relation from the vortex generator in a manner which minimizes the heat transfer from the wires to the vortex generator.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
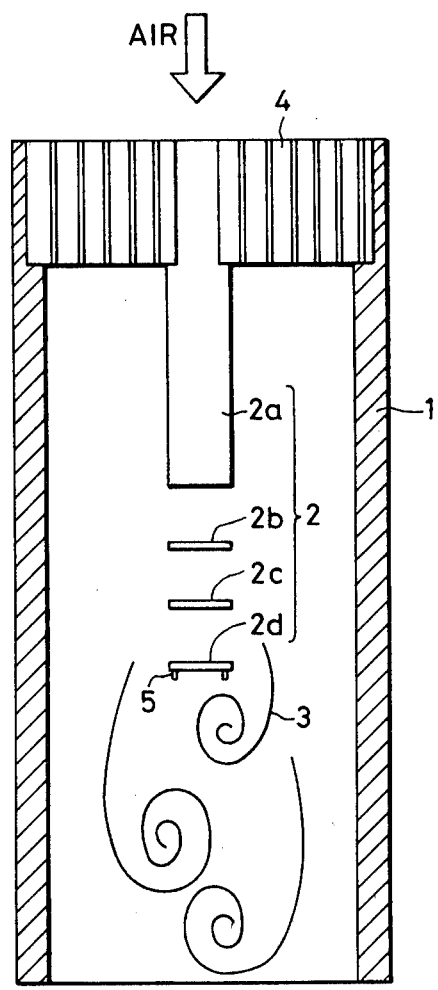
FIG. 1 is a schematic side elevation view, partly in section of the vortex flow meter according to the present invention.
Figure 2:
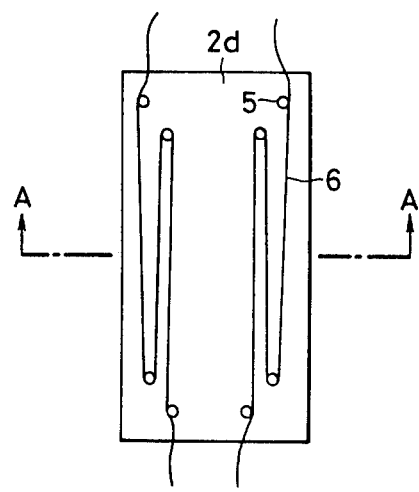
FIG. 2 is an end view of the vortex amplifying plate having the hot wires mounted thereon.
Figure 3:
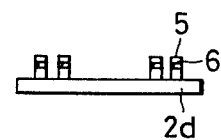
FIG. 3 is a sectional view taken along the line A—A of FIG. 2.

A vortex generator 2 is located within a conduit 1 for the purpose of generating a series of vortices 3 as shown in FIG. 1. The vortex generator 2 is comprised of a generating column 2a which extends coaxially of the conduit 1 and is supported by a grid 4 at the upstream end of the conduit. The grid 4 may contain suitable filter elements or the like and the fluid is directed into the conduit in the direction of the arrow as shown in FIG. 1. The vortex generator is further comprised of a plurality of vortex amplifying plates 2b, 2c and 2d which are arranged to amplify the series of Karman's vortices.

On the downstream side of the vortex amplifying plate 2d there are mounted a plurality of posts 5 to which the hot wires 6 are symmetrically secured under tension for the purpose of detecting the frequency of the vortices as they pass downwardly through the conduit as viewed in FIG. 1.

The vortices 3 are alternately generated on opposite sides of the vortex generator and as they move downstream past the amplifying plates, the hot wires 6 will be alternately cooled as each vortex passes. The alternate cooling of the hot wires through which an electric signal is passed varies the conductivity of the hot wires to thereby vary the current. The changes in current in each wire may be detected by a suitable circuit (not shown) for producing an output signal indicative of the frequency of the vortices passing through the conduit.

As mentioned previously, the hot wires 6 are mounted on the posts 5 under tension and may generate a form similar to the letter V or the letter N. It is also possible for the hot wires to be located about the posts 5 in a plurality of turns extending substantially parallel with the vortex generator plate. The portions of the hot wire leading to the posts may follow any suitable path outwardly of the conduit which will protect the wires 6 from being broken. The material of the vortex amplifying plate 2d may be chosen so as to minimize the possiblity of wire breakage due to thermal expansion. Since the hot wires are carried by the posts 5 on the amplifying plate in spaced relation to the amplifying plate 2d the wires do not lose their heat to the amplifying plate and therefore their responsiveness is not affected and extra heating of the wires is not required. Since the hot wires are disposed in the wake of the fluid to be measured, that is, on the downstream face of the vortex amplifying plate 2d, they are not subjected directly to the pressure of the fluid thereby increasing their durability.

Even though the vortex generator 2 has been described as being comprised of a plurality of parts and even though a plurality of hot wires are utilized, similar results can be obtained with a onepiece generator and a single hot wire.

While the invention has been particularly shown and described with reference to a preferred embodiment thereof, it will be understood by those in the art that various changes in form and details may be made therein without departing from the spirit and scope of the invention.

I claim:

1. A vortex flow meter comprising a conduit for the passage of a fluid therethrough from an upstream end to a downstream end, vortex generating means disposed in said conduit and having a surface at the downstream end thereof disposed at right angles with respect to the axis of said conduit, a plurality of posts secured to said surface and protruding therefrom in the downstream direction and hot wire means comprised of two wires symmetrically disposed with respect to each other on said posts under tension in a substantially zigzag fashion and in spaced relation to said surface for detecting the frequency of Karman's vortices generated downstream of said vortex generator means.

* * * * *